(12) United States Patent
Lusch

(10) Patent No.: US 8,235,235 B1
(45) Date of Patent: Aug. 7, 2012

(54) LIMIT SWITCH COVER WITH MAGNETIC BREAKAWAY

(75) Inventor: Rodger D. Lusch, Prospect, OH (US)

(73) Assignee: Honda Motor Co., Ltd., Tokyo (JP)

( * ) Notice: Subject to any disclaimer, the term of this patent is extended or adjusted under 35 U.S.C. 154(b) by 863 days.

(21) Appl. No.: 12/257,631

(22) Filed: Oct. 24, 2008

(51) Int. Cl.
*B65D 51/00* (2006.01)
*H01R 13/46* (2006.01)
*H01R 13/502* (2006.01)

(52) U.S. Cl. ........ 220/230; 174/559; 174/560; 174/561; 248/206.5; 248/309.4; 248/537; 248/683

(58) Field of Classification Search .......... 220/230; 174/520, 559, 560, 561; 248/206.5, 309.4, 248/537, 683
See application file for complete search history.

(56) References Cited

U.S. PATENT DOCUMENTS

| | | | |
|---|---|---|---|
| 3,598,900 A | 8/1971 | Drake | |
| 3,801,767 A | 4/1974 | Marks | |
| 4,135,320 A | 1/1979 | Smith | |
| 4,154,014 A | 5/1979 | Smith | |
| 4,950,842 A | 8/1990 | Menninga | |
| 5,456,373 A | 10/1995 | Ford | |
| 5,699,910 A * | 12/1997 | Kubat | 206/373 |
| 5,829,622 A | 11/1998 | Neuman | |
| 6,032,604 A | 3/2000 | Will | |
| 6,076,696 A | 6/2000 | Neuman | |
| 6,193,096 B1 | 2/2001 | Raoult | |
| 6,397,617 B1 | 6/2002 | Johnson | |
| 6,607,223 B1 | 8/2003 | Mastro | |

FOREIGN PATENT DOCUMENTS

| | | |
|---|---|---|
| CN | 1500418 | 6/2004 |
| GB | 605072 | 7/1948 |
| GB | 731714 | 6/1955 |
| WO | 98/24352 | 6/1998 |

* cited by examiner

*Primary Examiner* — Anthony Stashick
*Assistant Examiner* — Madison L Wright
(74) *Attorney, Agent, or Firm* — Rankin Hill & Clark LLP

(57) ABSTRACT

A breakaway-protective limit switch cover is provided that includes a main plate, a pair of support arms attached to the main plate, and a magnet attached to each support arm. The breakaway-protective-limit switch cover attaches, via the magnets, to a conveyor track of a power conveyor system and becomes dislodged upon impact from an external force strong enough to overcome the magnetic force of the magnets.

10 Claims, 3 Drawing Sheets

LIMIT SWITCH COVER WITH MAGNETIC BREAKAWAY

BACKGROUND OF THE INVENTION

1. Field of the Invention

The present invention relates to a conveyor system for transporting a dolly or a carrier and more specifically to a magnetic limit switch cover that attaches to the conveyor system.

2. Description of Related Art

In a power conveyor system limit switches are spaced periodically along a conveyor track to control the movement of the dolly. The limit switches are covered with a limit switch cover, which protects the limit switch from external forces. These external forces can either damage the limit switch or inadvertently trip the limit switch thereby disrupting the operation of the conveyor. The limit switch covers are typically rigidly mounted to the conveyor track and extend in an upward direction above the conveyor track. One disadvantage to the rigidly mounted limit switch cover is that, in certain instances, the dolly may contact the portion of the limit cover that extends above the conveyor track, which can damage the dolly, the limit switch and/or the limit switch cover, thereby disrupting operation of the conveyor system.

Another disadvantage is that in certain applications the conveyor track may be mounted on the manufacturing floor. In these applications it is possible for the workers to inadvertently contact or kick the limit switch covers with their foot or possibly get their foot caught between the limit switch cover and the dolly. This not only disrupts the operation of the conveyor system but, more importantly, can cause serious injury to the worker, which can be a lost time injury depending on the seriousness of the injury.

Thus, what is required is a limit switch cover that will overcome the above mentioned disadvantages.

SUMMARY OF THE INVENTION

In accordance with one aspect, the present invention overcomes the above mentioned disadvantages by providing a breakaway-protective cover that includes a main plate, a pair of support arms having a first end and a second end, the first end being operatively attached to the main plate, and an attachment means operatively attached to the second end of each support arm. The breakaway-protective cover removably attaches to a rigid structure via the attachment means and becomes dislodged upon impact from an external force strong enough to overcome the force of the attachment means.

In accordance with another aspect, the present invention provides a breakaway-protective-limit switch cover to protect a limit switch on a power conveyor system comprising a main plate, a pair of support arms having a first end and a second end, the first end being operatively attached to the main plate, and a magnet operatively attached to the second end of each support arm. The limit switch is positioned in a recessed area of a conveyor track of the power conveyor system. The breakaway-protective-limit switch cover removably attaches, via the magnets, to a side of the conveyor track adjacent to the recessed area to thereby protect the limit switch from an external force. In addition, the breakaway-protective-limit switch cover becomes dislodged upon impact from an external force strong enough to overcome the magnetic force of the magnets.

In accordance with yet another aspect, the present invention provides a power conveyor system comprising a conveyor track, a limit switch positioned in a recessed area of the conveyor track, and a breakaway-limit switch cover. The breakaway-limit switch cover includes a main plate, a pair of support arms having a first end and a second end, the first end being operatively attached to the main plate, and a magnet operatively attached to the second end of each support arm. The breakaway-limit switch cover removably attaches, via the magnets, to a side of the conveyor track adjacent to the recessed area to thereby protect the limit switch from an external force. Further, the breakaway-limit switch cover becomes dislodged upon impact from an external force strong enough to overcome the magnetic force of the magnets.

Additional benefits and advantages of the present invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings that form a part of the specification.

DETAILED DESCRIPTION OF THE INVENTION

Figure 1:
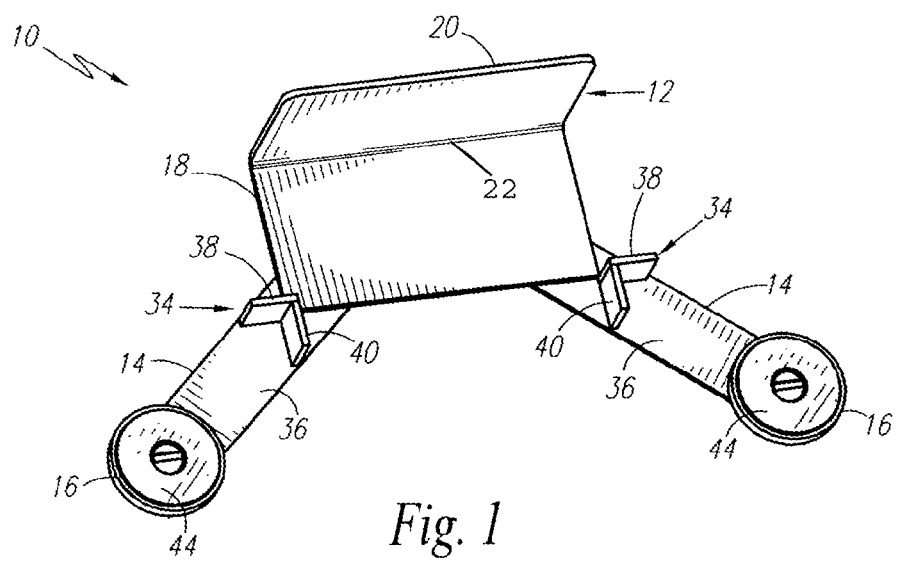
FIG. 1 is a front perspective view of a limit switch cover for a power conveyor system.

Referring now to the drawings, FIGS. 1-7 show a breakaway-protective cover 10 that attaches to a rigid structure to protect an electro-mechanical device. In the example embodiment shown in the figures the breakaway-protective cover 10 protects a limit switch that is located on a conveyor track of a power conveyor system. Thus, the example embodiment shown the figures is for illustrative purposes only and is not intended to limit the scope of the invention. The breakaway feature of the breakaway-protective cover 10 is provided to overcome the above mentioned disadvantages.

Referring to FIGS. 1-4, the breakaway-protective cover 10 includes a main cover plate 12, a pair of support arms 14, and an attachment means 16 attached to an end of each support arm 14. The main cover plate 12 is an integrated part that includes a vertical portion 18 and a horizontal portion 20. The horizontal portion 20 extends from a top edge 22 of the vertical portion 18 such that the horizontal portion 20 is substantially perpendicular to the vertical portion 18. Thus, the vertical portion 18 and the horizontal portion 20 form an angled plate having an angle of approximately 90°.

Figure 3:
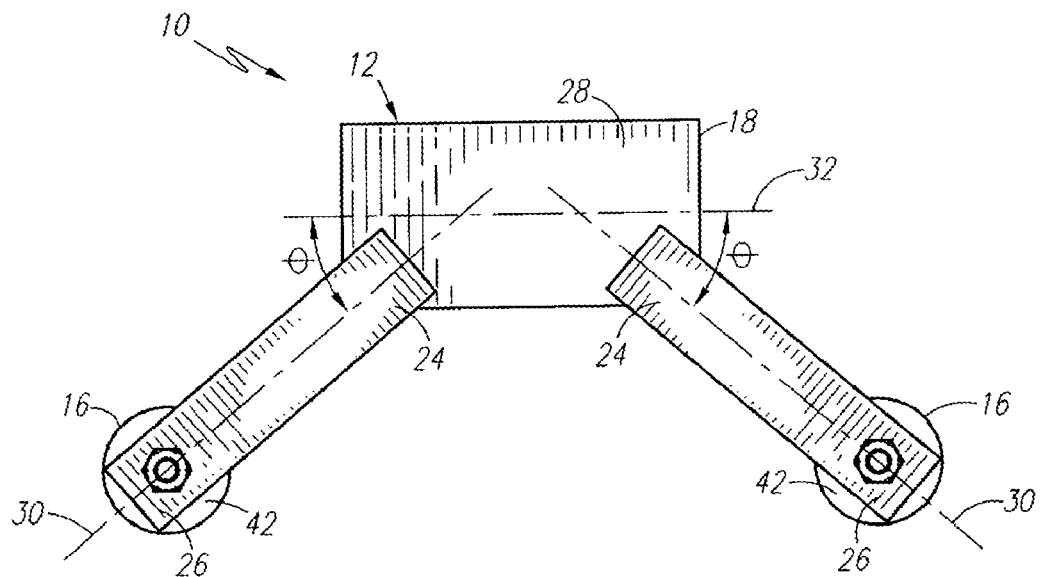
FIG. 3 is a rear view of the limit switch cover of FIG. 1.
Figure 4:
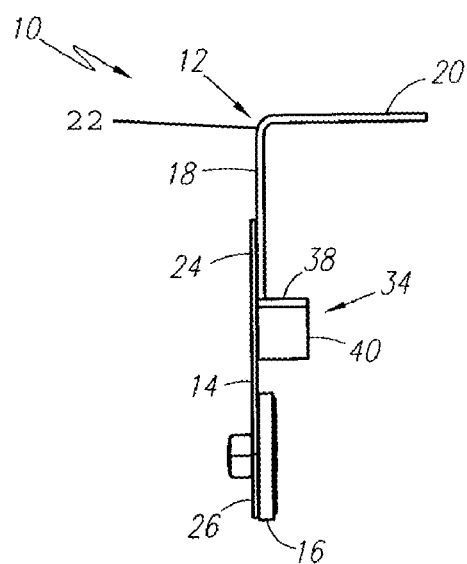
FIG. 4 is a side view of the limit switch cover of FIG. 1.

Referring to FIG. 3, the support arms 14 are rectangular in shape and include a first end 24 and a second end 26. The first end 24 of each support arm 14 is attached to a rear surface 28 of the vertical portion 18. Each support arm 14 extends vertically downward and vertically outward from the rear surface 28 of the vertical portion 18. Thus, a longitudinal axis 30 of each support arm 14 forms an acute angle θ with a longitudinal axis 32 of the vertical portion 18. Depending on the application, the angle θ may range anywhere from 15°-75°. Preferably the angle θ is approximately 35°. The support arms 14 can be attached to the rear surface 28 of the vertical portion 18 by any mechanical means known in the art such as by welding, with screws, rivets, etc. Preferably the support arms 14 are welded to the rear surface 28 of the vertical portion 18.

Figure 2:
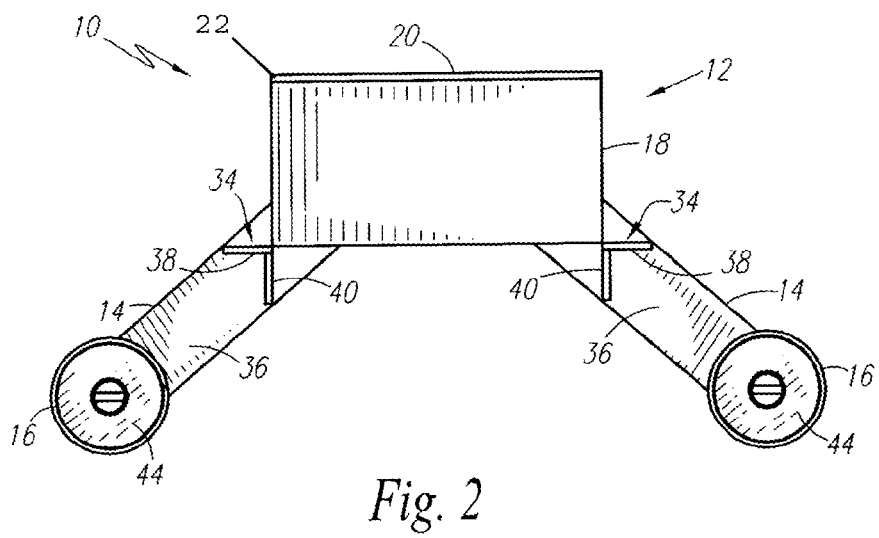
FIG. 2 is a front view of the limit switch cover of FIG. 1.

Referring to FIGS. 1 and 2, a support bracket 34 is fixedly attached to a front surface 36 of each support arm 14. The support bracket 34 includes a horizontal portion 38 and a vertical portion 40 that are joined at one end such that the horizontal portion 38 and the vertical portion 40 are substantially perpendicular to each other. When the breakaway-protective cover 10 is attached to the conveyor track the support bracket 34 ensures that the breakaway-protective cover 10 is properly positioned on the conveyor track. In addition, the support bracket 34 prevents the breakaway-protective cover 10 from sliding vertically downward and horizontally on the conveyor track. The support bracket 34 may be an integrated part and attached to the support arm 14 as a single part. On the other hand, the support bracket 34 may be two separated pieces whereby the horizontal portion 38 and the vertical portion 40 are attached to the support arm 14 as two separate parts. The support bracket 34 may be attached to the support arm 14 by any mechanical means commonly known in the art, such as but not limited to, welding.

Still referring to FIGS. 1-4, the attachment means 16 is a circular shaped magnet that is attached to the second end 26 of each support arm 14. The attachment means 16 attaches to the second end 26 of each support arm 14 such that a backside 42 is adjacent to the front surface 36 of the support arm 14 and a magnetic (or front) portion 44 faces outward away from the front surface 36 of the support arm 14. The strength of the magnet is such that the attachment means 16 magnetically secures the breakaway-protective cover 10 to the conveyor track while simultaneously allowing the breakaway-protective cover 10 to breakaway or become dislodged from the conveyor track if the breakaway-protective cover 10 is contacted by an external force strong enough to overcome the magnetic force of the magnet. Preferably the strength of the magnet is approximately 80 pounds. The attachment means 16 may be attached to the second end of each support arm 14 by any mechanical means commonly known in the art, such as but not limited to, screws, rivets, etc.

Figure 5:
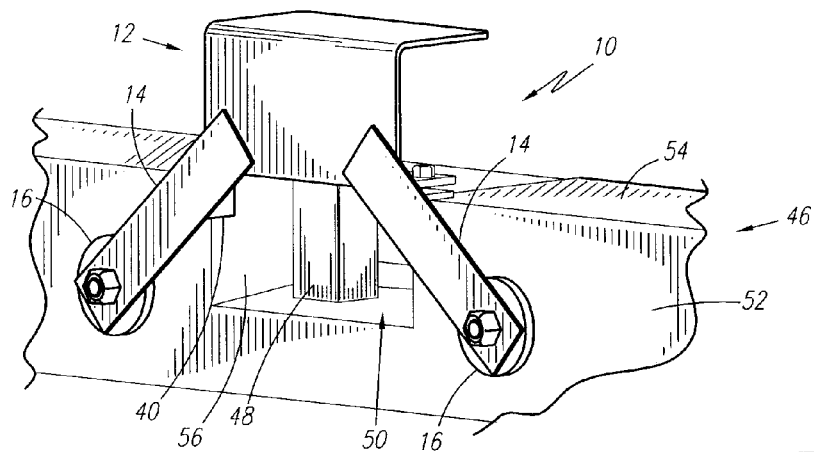
FIG. 5 is a perspective view of the limit cover attached to a conveyor track of the power conveyor system.
Figure 6:
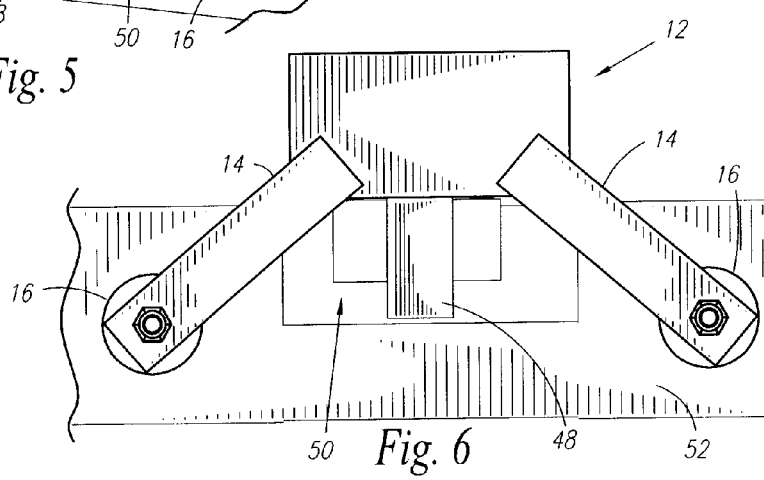
FIG. 6 is a close-up rear view of the limit switch cover attached to the conveyor track.
Figure 7:
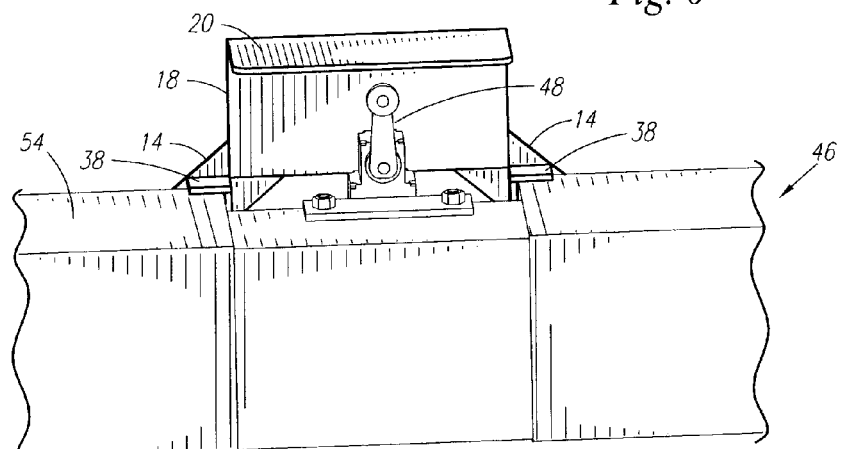
FIG. 7 is a close-up front view of the limit switch cover attached to the conveyor track.

FIGS. 5-7 show a portion of a conveyor track 46 including a limit switch 48 with the breakaway-protective cover 10 in an attached position. The limit switch 48 is positioned in a recessed area 50 of the conveyor track 46 and extends above the conveyor track 46, as shown in FIG. 7. The breakaway-protective cover 10 is removably attached to a side 52 of the conveyor track via the attachment means 16. When in an attached position the main cover plate 12 of the breakaway-protective cover 10 protects the limit switch 48 from an external force from behind and from above. Specifically, the vertical portion 18 extends upward to protect the limit switch 48 from an external force from behind and the horizontal portion 20 extends horizontally over the limit switch 48 to protect limit switch 48 from an external force from above.

Still referring to FIGS. 5-7, the breakaway-protective cover 10 is removably attached to the conveyor track 46 such that each horizontal portion 38 of the support bracket 34 is in contact with a top 54 of the conveyor track 46 to prevent the breakaway-protective cover 10 from sliding vertically downward and each vertical portion 40 of the support bracket 34 is in contact with an inside side wall 56 on each side of the recessed area 50 to prevent the breakaway-protective cover 10 from sliding in a horizontal direction along the conveyor track 46. In addition, the horizontal portion 38 and the vertical portion 40 of the support bracket 34 ensure that the breakaway-protective cover 10 is properly positioned to allow clearance for the dolly to properly trip the limit switch 48.

The advantage of the present invention, as mentioned above, is that the attachment means 16 provides a breakaway or dislodging feature. In other words, the magnet allows the breakaway-protective cover 10 to breakaway or become dislodged if struck by the dolly or kicked by the worker, as mentioned above.

While specific embodiments of the invention have been described and illustrated, it is to be understood that these embodiments are provided by way of example only and that the invention is not to be construed as being limited but only by proper scope of the following claims.

What is claimed is:

1. A breakaway-protective cover for a limit switch on a conveyor system comprising:
   a main plate having a vertical portion positioned adjacent the limit switch and a horizontal portion disposed over the limit switch;
   a pair of support arms having a first end and a second end, the first end being operatively attached to the main plate; and
   a removable attachment device operatively attached to the second end of each support arm,
   wherein the breakaway-protective cover removably attaches to a rigid structure of the conveyor system via the removable attachment device and becomes dislodged upon impact from an external force strong enough to overcome an attachment force of the removable attachment device.

2. The breakaway-protective cover of claim 1, wherein the removable attachment device is a magnet having a magnetic force strong enough to secure the breakaway-protective cover to the rigid structure while simultaneously allowing the breakaway-protective cover to become dislodged upon impact from an external force strong enough to overcome the magnetic force of the magnet.

3. The breakaway-protective cover of claim 2, wherein the horizontal portion extends from a top edge of the vertical portion such that the horizontal portion is substantially perpendicular to the vertical portion.

4. The breakaway-protective cover of claim 3, wherein the support arms are operatively attached to a rear surface of the vertical portion of the main plate and extend in a downward and outward direction such that a longitudinal axis of each support arm forms an acute angle with a longitudinal axis of the vertical portion.

5. The breakaway-protective cover of claim 4, wherein the support arms include a support bracket operatively attached to a front surface of each support arm, and wherein the support bracket includes a horizontal portion and a vertical portion that are joined at one end such that horizontal portion is substantially perpendicular to the vertical portion.

6. A breakaway-protective-limit switch cover to protect a limit switch on a power conveyor system comprising:
   a main plate;
   a pair of support arms having a first end and a second end, the first end being operatively attached to the main plate; and
   a magnet operatively attached to the second end of each support arm,
   wherein the limit switch is positioned in a recessed area of a conveyor track of the power conveyor system,
   wherein the breakaway-protective-limit switch cover removably attaches, via the magnets, to a side of the conveyor track adjacent to the recessed area to thereby protect the limit switch from an external force, and wherein the breakaway-protective-limit switch cover becomes dislodged upon impact from an external force strong enough to overcome the magnetic force of the magnets.

7. The breakaway-protective-limit switch cover of claim 6, wherein the main plate includes a vertical portion to protect the limit switch from the external force from behind and a horizontal portion to protect the limit switch from the external force from above, and wherein the horizontal portion extends from a top edge of the vertical portion such that the horizontal portion is substantially perpendicular to the vertical portion.

8. The breakaway-protective-limit switch cover of claim 7, wherein the support arms are operatively attached to a rear surface of the vertical portion of the main plate and extend in a downward and outward direction such that a longitudinal axis of each support arm forms an angle of approximately 35° with a longitudinal axis of the vertical portion.

9. The breakaway-protective-limit switch cover of claim 8, wherein the support arms include a support bracket operatively attached to a front surface of each support arm and wherein the support bracket includes a horizontal portion and a vertical portion that are joined at one end such that horizontal portion is substantially perpendicular to the vertical portion.

10. The breakaway-protective-limit switch cover of claim 9, wherein when the breakaway-protective-limit switch cover is attached to the conveyor track the horizontal portion of the support bracket is in contact with a top of the conveyor track and the vertical portion of the support bracket is in contact with an inside side wall of a recessed area of the conveyor track to thereby ensure that the breakaway-protective-limit switch cover is properly positioned.

* * * * *